US012675392B2

(12) United States Patent
Raz et al.

(10) Patent No.: US 12,675,392 B2
(45) Date of Patent: Jul. 7, 2026

(54) SYSTEM AND METHOD OF MANAGING MEMORY ACCESS AMONG ONE OR MORE COMPUTING ENTITIES

(71) Applicant: NEXT SILICON LTD., Givatayim (IL)

(72) Inventors: Elad Raz, Ramat Gan (IL); Alex Margolin, Ashdod (IL)

(73) Assignee: NEXT SILICON LTD., Givatayim (IL)

( * ) Notice: Subject to any disclaimer, the term of this patent is extended or adjusted under 35 U.S.C. 154(b) by 0 days.

(21) Appl. No.: 18/415,979

(22) Filed: Jan. 18, 2024

(65) Prior Publication Data

US 2025/0238357 A1     Jul. 24, 2025

(51) Int. Cl.
*G06F 12/02*          (2006.01)
(52) U.S. Cl.
CPC ................................. *G06F 12/0223* (2013.01)
(58) Field of Classification Search
None
See application file for complete search history.

(56) References Cited

U.S. PATENT DOCUMENTS

| | | | |
|---|---|---|---|
| 8,135,024 B2 | 3/2012 | Abel et al. | |
| 8,694,584 B2 * | 4/2014 | Chan ........................ | G06F 16/14 |
| | | | 709/219 |
| 10,592,578 B1 * | 3/2020 | Mokashi ................ | H04N 21/25 |
| 11,601,699 B2 | 3/2023 | Hall et al. | |
| 11,829,792 B1 * | 11/2023 | Chandrashekar ... | G06F 9/45558 |

| | | | |
|---|---|---|---|
| 2003/0120867 A1 * | 6/2003 | Cuomo ............... | G06F 12/0888 |
| | | | 711/E12.021 |
| 2007/0094312 A1 * | 4/2007 | Sim-Tang ............. | G06F 16/125 |
| 2008/0320151 A1 * | 12/2008 | McCanne ............... | H03M 7/30 |
| | | | 709/228 |
| 2011/0161619 A1 * | 6/2011 | Kaminski ........... | G06F 12/1027 |
| | | | 711/E12.016 |
| 2011/0296104 A1 * | 12/2011 | Noda .................. | G06F 11/1084 |
| | | | 711/114 |
| 2012/0117312 A1 * | 5/2012 | Chan ..................... | G06F 16/172 |
| | | | 711/170 |
| 2013/0179478 A1 * | 7/2013 | Excoffier ................ | G06F 16/27 |
| | | | 707/821 |

(Continued)

*Primary Examiner* — Hosain T Alam
*Assistant Examiner* — Ryan Dare
(74) *Attorney, Agent, or Firm* — The Roy Gross Law Firm, LLC; Roy D. Gross

(57) ABSTRACT

A method, a system and an accelerator for managing memory access among one or more computing entities may continuously monitor data access to at least one memory module, associated with a respective source computing entity. Based on the monitoring, embodiments may identify a memory area of the source memory module that contains a predetermined quantity of data that is expected to be used by a sink computing entity, and transmit a first version of content of the identified memory area to the sink computing entity. Embodiments may then identify an explicit request, from the sink computing entity to the source computing entity, for accessing data of the identified memory area. Embodiments may subsequently calculate a difference between the first version of content of the identified memory area and a current content of the identified memory area, and transmit the calculated difference to the requesting sink computing entity.

17 Claims, 7 Drawing Sheets

(56)            References Cited

U.S. PATENT DOCUMENTS

| | | | |
|---|---|---|---|
| 2013/0185270 A1* | 7/2013 | Brower | G06F 16/2343 |
| | | | 707/704 |
| 2019/0082040 A1* | 3/2019 | Aziz | H04L 69/324 |
| 2022/0391190 A1* | 12/2022 | Ravoor | G06F 8/65 |
| 2023/0153245 A1* | 5/2023 | Jo | G06F 12/0862 |
| | | | 711/103 |
| 2023/0185717 A1* | 6/2023 | Lee | G06F 3/0679 |
| | | | 711/141 |
| 2023/0198548 A1* | 6/2023 | Guilford | G06F 12/04 |
| | | | 711/154 |
| 2023/0236764 A1* | 7/2023 | Vaideeswaran | G06F 3/0619 |
| | | | 711/154 |

* cited by examiner

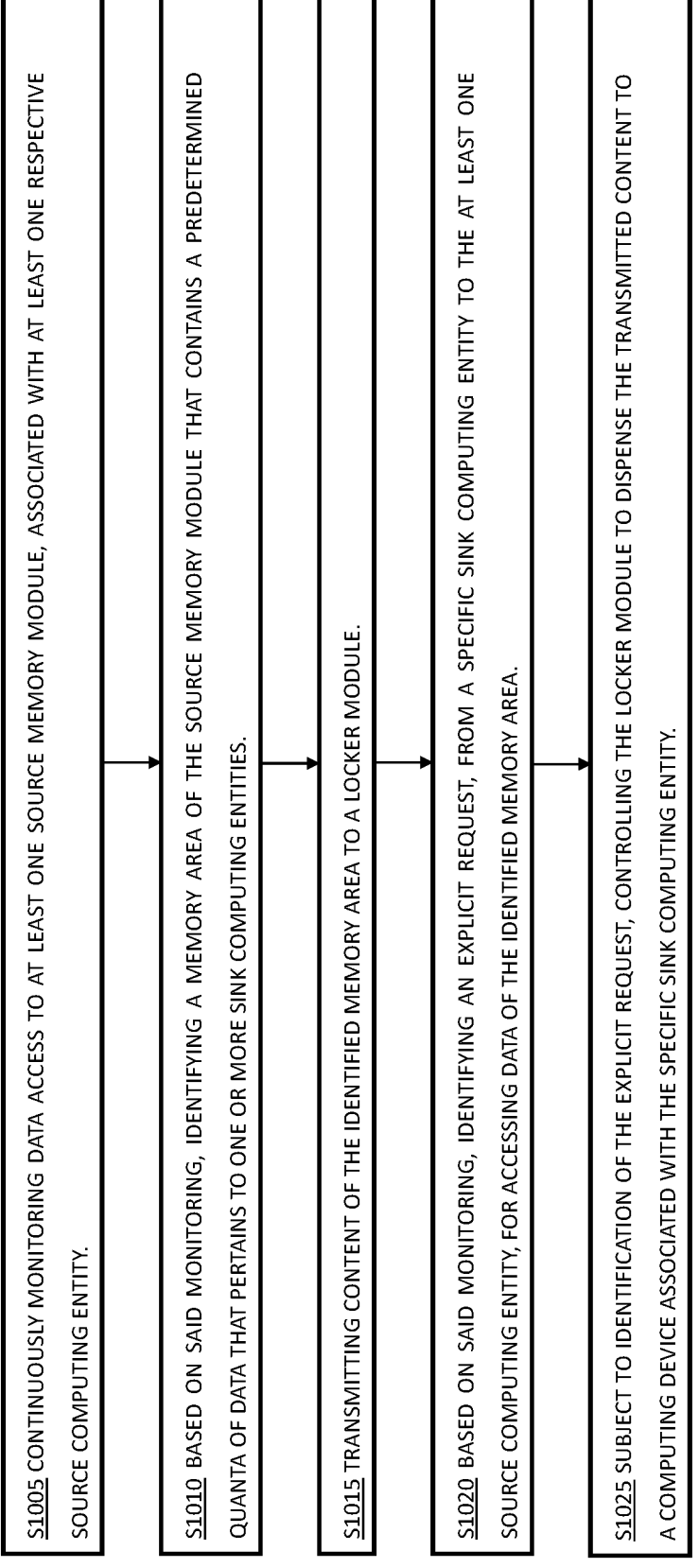

S1005 CONTINUOUSLY MONITORING DATA ACCESS TO AT LEAST ONE SOURCE MEMORY MODULE, ASSOCIATED WITH AT LEAST ONE RESPECTIVE SOURCE COMPUTING ENTITY.

S1010 BASED ON SAID MONITORING, IDENTIFYING A MEMORY AREA OF THE SOURCE MEMORY MODULE THAT CONTAINS A PREDETERMINED QUANTA OF DATA THAT PERTAINS TO ONE OR MORE SINK COMPUTING ENTITIES.

S1015 TRANSMITTING CONTENT OF THE IDENTIFIED MEMORY AREA TO A LOCKER MODULE.

S1020 BASED ON SAID MONITORING, IDENTIFYING AN EXPLICIT REQUEST, FROM A SPECIFIC SINK COMPUTING ENTITY TO THE AT LEAST ONE SOURCE COMPUTING ENTITY, FOR ACCESSING DATA OF THE IDENTIFIED MEMORY AREA.

S1025 SUBJECT TO IDENTIFICATION OF THE EXPLICIT REQUEST, CONTROLLING THE LOCKER MODULE TO DISPENSE THE TRANSMITTED CONTENT TO A COMPUTING DEVICE ASSOCIATED WITH THE SPECIFIC SINK COMPUTING ENTITY.

FIG. 4

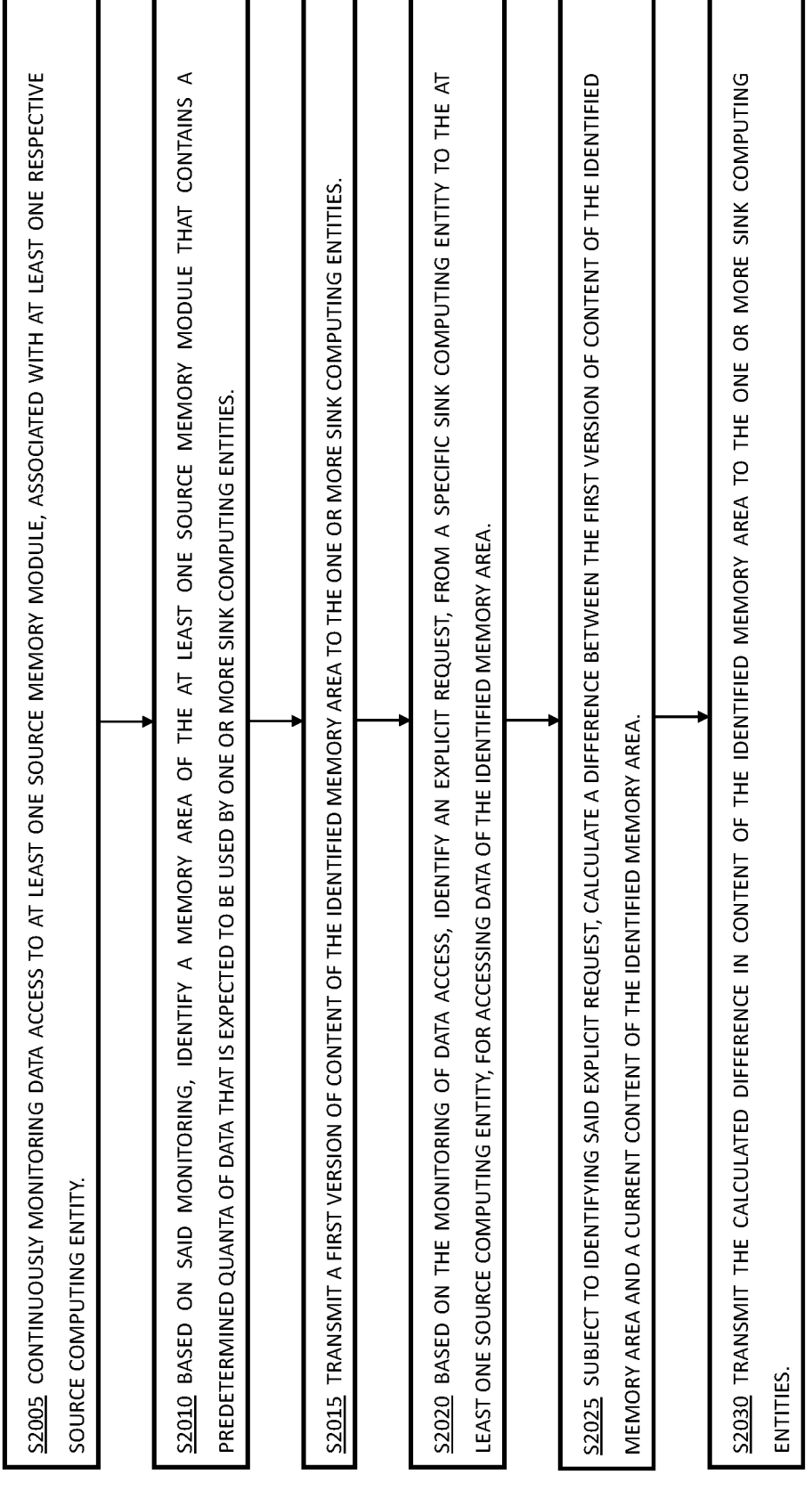

S2005 CONTINUOUSLY MONITORING DATA ACCESS TO AT LEAST ONE SOURCE MEMORY MODULE, ASSOCIATED WITH AT LEAST ONE RESPECTIVE SOURCE COMPUTING ENTITY.

S2010 BASED ON SAID MONITORING, IDENTIFY A MEMORY AREA OF THE AT LEAST ONE SOURCE MEMORY MODULE THAT CONTAINS A PREDETERMINED QUANTA OF DATA THAT IS EXPECTED TO BE USED BY ONE OR MORE SINK COMPUTING ENTITIES.

S2015 TRANSMIT A FIRST VERSION OF CONTENT OF THE IDENTIFIED MEMORY AREA TO THE ONE OR MORE SINK COMPUTING ENTITIES.

S2020 BASED ON THE MONITORING OF DATA ACCESS, IDENTIFY AN EXPLICIT REQUEST, FROM A SPECIFIC SINK COMPUTING ENTITY TO THE AT LEAST ONE SOURCE COMPUTING ENTITY, FOR ACCESSING DATA OF THE IDENTIFIED MEMORY AREA.

S2025 SUBJECT TO IDENTIFYING SAID EXPLICIT REQUEST, CALCULATE A DIFFERENCE BETWEEN THE FIRST VERSION OF CONTENT OF THE IDENTIFIED MEMORY AREA AND A CURRENT CONTENT OF THE IDENTIFIED MEMORY AREA.

S2030 TRANSMIT THE CALCULATED DIFFERENCE IN CONTENT OF THE IDENTIFIED MEMORY AREA TO THE ONE OR MORE SINK COMPUTING ENTITIES.

SYSTEM AND METHOD OF MANAGING MEMORY ACCESS AMONG ONE OR MORE COMPUTING ENTITIES

FIELD OF THE INVENTION

The present invention relates generally to systems of computer memory. More specifically, the present invention relates managing memory access among one or more computing entities.

BACKGROUND OF THE INVENTION

Communication systems, both wired and wireless, play a pivotal role in the modern information age. The demand faster and reliable data transmission has grown exponentially with the increasing complexity of applications and the ever-expanding volume of digital information. Conventional data transmission methods, however, face challenges in meeting the escalating demands for higher throughput and reduced latency.

One of the major bottlenecks in data transmission arises from the limitations imposed by the existing protocols, hardware, and network architectures. As technology evolves, the need for innovative solutions to overcome these limitations becomes increasingly imperative.

SUMMARY OF THE INVENTION

Embodiments of the present invention address these challenges by introducing a novel accelerator, specifically designed to optimize data transmission, or management over communication channels.

According to some embodiments, the accelerator may include a non-transitory program memory device, where modules of instruction code are stored, and at least one processor associated with the non-transitory program memory device, and configured to execute the modules of instruction code.

Upon execution of said modules of instruction code, the at least one processor may be configured to continuously monitor data access to at least one source memory module, associated with at least one respective source computing entity.

Based on this monitoring, the at least one processor may identify a memory area of the at least one source memory module that contains a predetermined quantity of data, that is expected to be used by one or more sink computing entities. According to some embodiments, the accelerator may consequently transmit a first version of content of the identified memory area to the one or more sink computing entities, e.g., without, or before having received an explicit request from sink computing entities to access that memory area.

Based on the monitoring of data access the at least one processor may then identify an explicit request, from a specific sink computing entity to the at least one source computing entity, for accessing data of the identified memory area. Subject to identifying the explicit request, the at least one processor may calculate a difference between the first version of content of the identified memory area and a current content of the identified memory area, and transmit the calculated difference in content of the identified memory area to the one or more sink computing entities.

Additionally, or alternatively, the at least one processor may be configured to transmit the content of the identified memory area to the one or more sink computing entities via a locker memory or buffer.

For example, the accelerator may transmit the content of the identified memory area to a locker module having a locker storage space. Based on the monitoring of data access, the at least one processor may identify an explicit request, from a specific sink computing entity to the at least one source computing entity, for accessing data of the identified memory area. Subject to identifying the explicit request, the at least one processor may control the locker module to dispense the transmitted memory area content to the specific sink computing entity, or to a computing device associated with the specific sink computing entity.

Additionally, or alternatively, the at least one processor may be further configured to identify, based on the monitoring of data access, occurrence of a change in content of the identified memory area. The at least one processor may subsequently calculate a difference between the first version of content of the identified memory area and a current content of the identified memory area. The at least one processor may then transmit the calculated difference in content of the identified memory area to the locker module. The locker module may, in turn, be configured to calculate, and/or store an amended version of the transmitted content in the locker storage space, based on the calculated difference.

Additionally, or alternatively, based on the monitoring of data access, the at least one processor may identify an explicit request, from a specific sink computing entity to the at least one source computing entity, for accessing data of the identified memory area. Subject to identifying the explicit request, the at least one processor may control the locker module to dispense the amended version of the transmitted content to the specific sink computing entity or to a computing device associated with the specific sink computing entity.

According to some embodiments, the at least one processor may identify the memory area of the source memory module by: (a) based on the monitoring of data access, identifying a memory region characterized by spatial locality of data pertaining to the one or more sink computing entities; (b) predict an extension of the identified memory region; and (c) define the memory area based on the predicted extension.

Additionally, or alternatively, the at least one processor may be further configured to: based on the monitoring of data access, identify occurrence of a triggering event; and transmit the content of the identified memory area to the locker module, subject to the identified triggering event occurrence.

For example, the at least one processor may be further configured to: calculate a rate at which data pertaining to the one or more sink computing entities is written into the defined memory area. Based on the calculated rate, the at least one processor may predict a future timestamp at which the defined memory area will comprise a predetermined portion of fresh data; The at least one processor may then identify the occurrence of a triggering event as elapse of the predicted timestamp.

In another example the triggering event may include, for example: filling of the defined memory area with a predetermined portion of fresh data pertaining to the one or more sink computing entities; identifying a predefined number of write, delete or modify data accesses to the defined memory area; elapse of a predetermined, recurring time frame; occurrence of a specific program-counter value in a computing device associated with the one or more sink computing entities; occurrence of a specific program-counter value in a computing device associated with the one or more source computing entities, and any combination thereof.

Additionally, or alternatively, the at least one processor may monitor signals of the one or more source computing entities or one or more sink computing entities. Based on this monitoring of signals, the at least one processor may recognize at least one signal as likely to precede the explicit request for accessing data of the identified memory area. The at least one processor may then identify the occurrence of a triggering event as occurrence of the recognized at least one signal.

According to some embodiments, the at least one processor may identify a deallocation of the memory area of the source memory module. The at least one processor may subsequently communicate a release message, distinguishing the deallocated the memory area, to the locker module. The locker module may, in turn, be configured to release, or deallocate a region of the locker storage space based on the release message.

Additionally, or alternatively, the at least one processor may identify an overflow of locker storage space. The at least one processor may communicate a release message, distinguishing a low-priority memory area, to the locker module. The locker module may, in turn, release a region of the locker storage space based on the release message, to overcome the overflow of locker storage space.

According to some embodiments, the one or more sink computing entities and the at least one source computing entities may pertain to a common software application, executed by a common computing device. Additionally, or alternatively, the one or more sink computing entities may be executed by one or more respective client computing devices, and wherein the at least one source computing entities are executed by at least one respective server computing devices.

According to some embodiments, the accelerator may be included in, or implemented by the one or more sink devices, the one or more source devices or any combination thereof. Additionally, or alternatively, the accelerator may be implemented by a computing device that is separate from the one or more sink devices and one or more source devices.

Embodiments of the invention may include a system for managing memory access among computing entities.

Embodiments of the system may include (a) one or more source computing devices associated with at least one source memory module; (b) an accelerator module and (c) a locker module.

The accelerator module may be configured to continuously monitor data access to the at least one source memory module. Based on this monitoring, the accelerator module may identify a memory area of the at least one source memory module that contains a predetermined quantity of data that pertains to one or more sink computing entities. The accelerator module may subsequently transmit content of the identified memory area to a locker module.

Based on the monitoring of data access, the accelerator module may identify an explicit request, from a specific sink computing entity of said one or more sink computing entities, to the at least one source computing entity, for accessing data of the identified memory area. Subject to the identification of the explicit request, the accelerator module may communicate a release message to the locker module. The locker module may, in turn, be configured to dispense the content of the identified memory area to the specific sink computing entity based on, of subject to the release message.

Embodiments of the invention may include method of managing memory access among one or more computing entities, by at least one processor.

Embodiments of the method may include continuously monitoring data access to at least one source memory module, associated with at least one respective source computing entity. Embodiments of the method may further include identifying, based on this monitoring, a memory area of the source memory module that contains a predetermined quantity of data that pertains to one or more sink computing entities, and transmitting content of the identified memory area to a locker module; identifying an explicit request, from a specific sink computing entity to the at least one source computing entity, for accessing data of the identified memory area; and subject to identification of the explicit request, controlling the locker module to dispense the transmitted content to a computing device associated with the specific sink computing entity.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 4 is a flow diagram, depicting a method of managing memory access among one or more computing entities, according to some embodiments of the invention; and FIG. 5 is a flow diagram, depicting another method of managing memory access among one or more computing entities, according to some embodiments of the invention.

Figure 1:
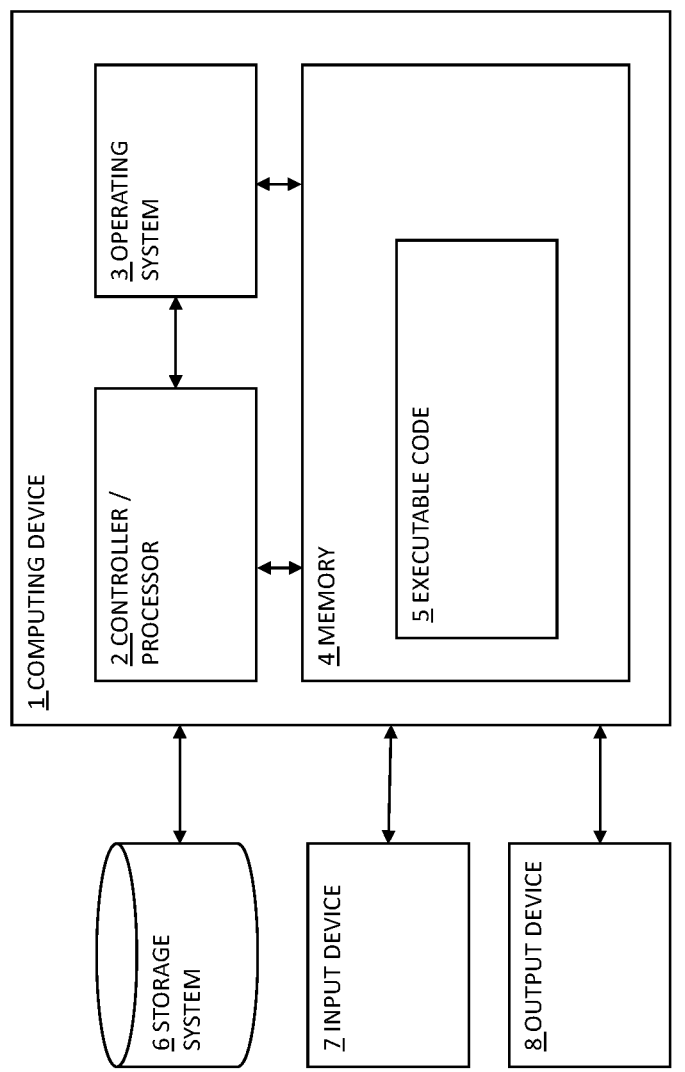
FIG. 1 is a block diagram, depicting a computing device which may be included in a system for managing memory access among one or more computing entities according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items.

Unless explicitly stated, the method embodiments described herein are not constrained to a particular order or sequence. Additionally, some of the described method embodiments or elements thereof can occur or be performed simultaneously, at the same point in time, or concurrently.

Embodiments of the present invention may include a method, an accelerator and a system for managing memory access among one or more computing entities. The term computing entity may be used herein to refer to an instance of a computer program or application, that may include one or many threads, and may be executed by one or more processors (e.g., central processing units (CPUs)) or controllers.

Reference is now made to FIG. 1, which is a block diagram depicting a computing device, which may be included within an embodiment of a system for managing memory access among one or more computing entities, according to some embodiments.

Computing device 1 may include a processor or controller 2 that may be, for example, a CPU, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may manage memory among one or more computing processes, as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to one or more processes and/or applications may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of CPUs or any other suitable multi-purpose or specific processors or controllers (e.g., similar to element 2), a plurality of input units, a plurality of output units, a plurality of memory units, and a plurality of storage units.

Figure 2:
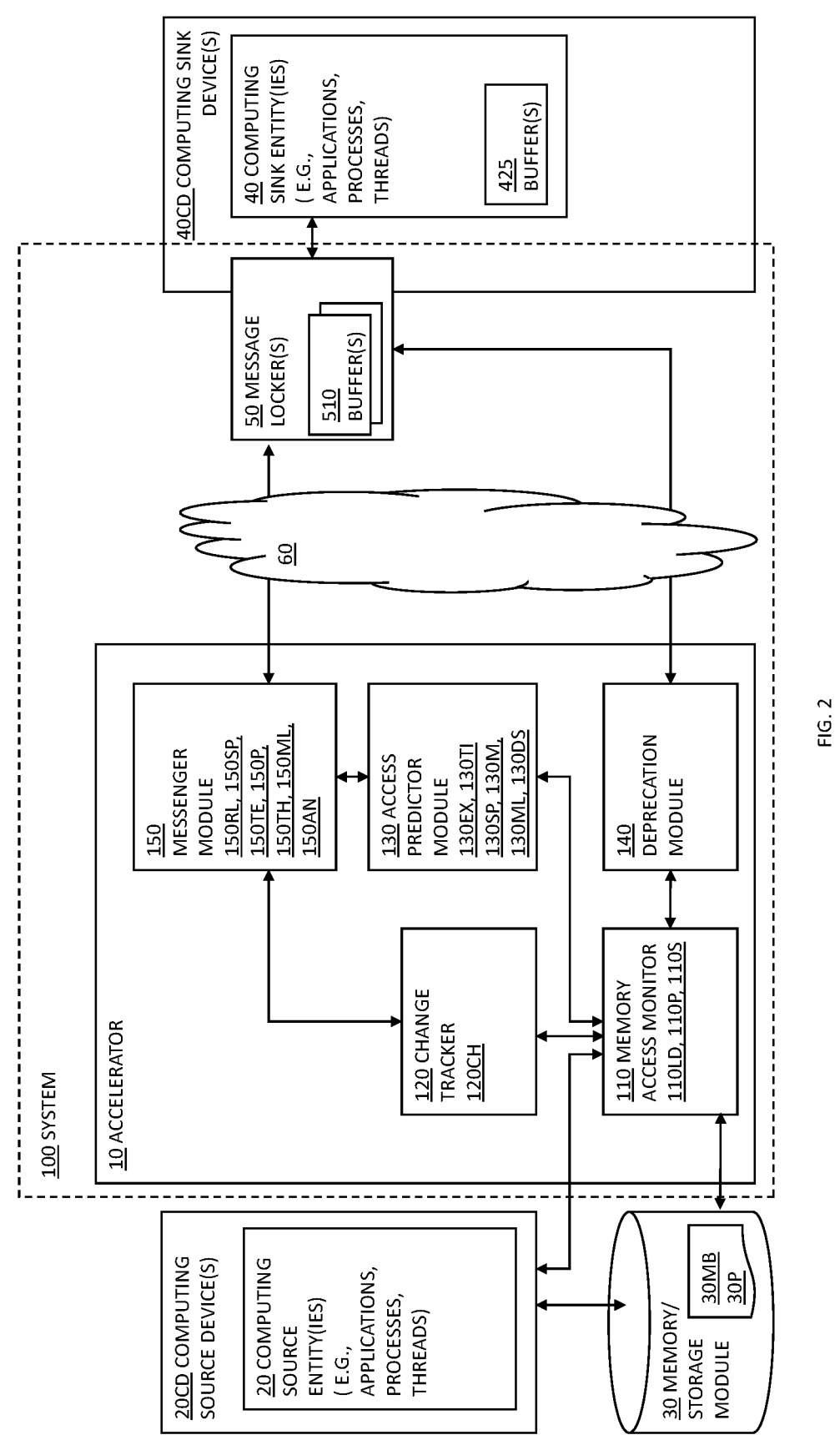
FIG. 2 is a block diagram, depicting a system for managing memory access among one or more computing entities, according to some embodiments of the invention.

Reference is now made to FIG. 2, which depicts a system 100 for managing memory access among one or more computing entities, according to some embodiments. As shown in FIG. 2, arrows may represent flow of one or more data elements to and from system 100 and/or among modules or elements of system 100. Some arrows have been omitted in FIG. 2 for the purpose of clarity.

According to some embodiments, system 100 may include an accelerator module 10 that may be implemented as a software module, a hardware module, or any combination thereof. For example, accelerator 10 may be or may include a computing device (e.g., computing device 1 of FIG. 1), and may be adapted to execute one or more modules of executable code (e.g., element 5 of FIG. 1) to manage memory access among one or more computing entities, as further described herein.

In some embodiments, accelerator 10 may be configured to manage memory access between one or more source computing entities 20, and one or more communicatively connected sink computing entities 40.

The term "source computing entity 20" (or "source 20" for short) may refer to a software computing entity such as a computing program, process, thread and the like, that may be regarded as an origin, or source of data. The term "source device" 20CD may relate to a computing device (e.g., device 1 of FIG. 1) that may host, or execute one or more source computing entities 20. It may be appreciated that data access requests may relate to specific source computing entity 20 that are hosted on, or executed by corresponding source devices. Therefore, the terms "source computing entity 20" and "source device 20CD" may be used interchangeably, according to context.

In a complementary manner, the term "sink computing entity 40" (or "sink 40" for short) may be used herein to refer to a software computing entity such as a computing program, process, thread and the like, that may be regarded as a recipient of data from one or more sources 20. The term "sink device" 40CD may be used herein to refer to a computing device (e.g., device 1 of FIG. 1) that may host, or execute one or more sink computing entities 40. It may be appreciated that data access requests may address specific sink computing entities 40, hosted by corresponding sink devices 40CD. Therefore, the terms "sink 40" and "sink device 40CD" may be used interchangeably, according to context.

It may be appreciated that system 100 may be implemented in a variety of configurations and manners, to facilitate a respective variety of applications and needs.

For example, in some embodiments, system 100 may be configured to manage memory access among a plurality of computing entities (e.g., 20, 40) on a common, or single computing platform (e.g., 20CD, 40CD). For example, the one or more sink computing entities 40 and the at least one source computing entities 20 may pertain to a common software application, executed by a common computing device 1. In such configurations, and as explained herein, accelerator 10 may function as a novel combination between an inter-process communication (IPC) mechanism and a caching mechanism, to optimize transfer of data between at least one source-side computing entity 20 and at least one associated sink-side computing entity 40.

In another example, and as shown in FIG. 2, system 100 may be configured to manage memory access between one or more source computing devices or platforms 20CD (e.g., servers) and one or more other, communicatively connected sink computing devices 40CD or platforms (e.g., clients).

In such embodiments, system 100 may include, or may be communicatively connected to at least one source computing device 20 such as a data server. Source computing device 20CD may implement or execute one or more respective source-side software computing entities 20. Source-side computing entities 20 may be, or may include one or more software applications, processes and/or threads, adapted to access (e.g., read, write, delete, modify, etc.) at least one region of memory, stored in a storage module or memory module 30.

In a complementary manner, the one or more client computing devices 40CD may be configured to implement or execute one or more respective sink-side computing entities 40. As known in the art, sink-side computing entities 40 may be adapted to communicate, e.g., via a communication network 60 (e.g., the Internet) with source-side entities 20, to access relevant data that may be stored on memory module 30.

Accelerator module 10 may be implemented on the same computing device as sink device 40 and/or source device 20, or (as depicted in the non-limiting example of FIG. 2) be implemented in a separate computing platform or device. As elaborated herein, accelerator module 10 may be configured to optimize access and transfer of data between source computing entities 20 (and/or source devices 20CD) and sink computing entities 40 (and/or sink devices 40CD).

The terms "memory" and "storage" may be used interchangeably in relation to module 30, according to context, to refer to any relevant software and/or hardware module that may be adapted to maintain digital data. For example, memory module 30 may represent cloud based storage, that may be utilized by a cloud based server (e.g., implemented by source device 20CD) to serve a plurality of client computing devices (e.g., implemented by sink devices 40CD). Additionally, or alternatively, memory module 30 may represent an on-chip memory module (e.g., a Random Access Memory (RAM) module), adapted to provide program and/or data memory capabilities for one or more on-chip processing units.

According to some embodiments, accelerator module 10 may include a non-transitory program memory device (e.g., memory 4 of FIG. 1), where modules of instruction code are stored, and at least one processor (e.g., processor 2 of FIG. 1) associated with the program memory device, and configured to execute the modules of instruction code. Upon execution of said modules of instruction code, the at least one processor 2 may allow accelerator 10 to implement methods of managing memory access among one or more computing entities (e.g., 20, 40), as elaborated herein.

According to some embodiments, accelerator 10 may include a memory access monitor module 110, adapted to continuously (e.g., repeatedly, over time) monitor data access to at least one source memory module 30, associated with at least one respective, first source computing entity 20.

For example, accelerator 10 may be implemented on the same computing platform as source computing device 20CD, and may monitor access to a memory module 30 that may also be implemented on the same computing platform. In such embodiments, memory access monitor module 110 may continuously monitor access to memory 30 in a synchronous manner, e.g., by repeatedly poling the first source computing application or entity 20, every predetermined time frame. Additionally, or alternatively memory access monitor module 110 may continuously monitor access to memory 30 in an asynchronous manner, e.g., following reception of an appropriate signal (e.g., and interrupt) or IPC communication from source computing entity 20.

In another example, accelerator 10 may be implemented on a different computing platform from source device 20CD, and may monitor access to a storage module 30 that may be communicatively connected to source device 20 and/or to accelerator 10. In such embodiments, memory access monitor module 110 may continuously monitor access to storage 30 in a synchronous manner, e.g., by repeatedly poling storage module 30, the first source computing entity 20 and/or the first source device 20CD for access (e.g., read, write, delete, modify, etc.) to storage 30.

In yet another example, data on storage module 30 may be accessed or modified by a second source computing entity 20, e.g., implemented by a second source device 20CD. In such embodiments, memory access monitor module 110 may continuously monitor access to storage 30 in a synchronous manner, e.g., by repeatedly poling storage module 30, first source computing device 20CD and/or second source computing device 20CD.

Other examples for monitoring access to storage 30 in real-time, or near real-time may also be possible, depending on the specific implementation of system 100.

Based on the continuous monitoring of the one or more source memory modules 30, memory access monitor module 110 may produce a data-access ledger data element 110LD. Ledger data element 110LD may represent occurrences, and/or patterns of data access to memory modules 30.

In other words, ledger data element 110LD may be, or may include a data structure such as a table, a linked object list, and the like. This data structure may aggregate information regarding data access to memory module 30, including for example: a type of data access (read, write, delete, etc.), a timing of the data access, an identification of a source-side application or entity 20 accessing memory module 30, an identification of a sink-side application or entity 40 accessing memory module 30, a physical location (e.g., a block number) of accessed data, a size, or quantity of the accessed data, and the like.

Additionally, or alternatively, ledger data element 110LD may represent statistical information pertaining to data access or data update occurrences of memory module 30, including for example timing of data access, frequency of data access, repetitiveness of data access, and the like.

Additionally, or alternatively, ledger data element 110LD may represent context of data access occurrences, e.g., which software applications (e.g., 20/40) or functions may be concurrent with, or precede occurrences of data access; which events or signals (e.g., program counter values, interrupts, IPC communication messages, and the like) of software applications (e.g., 20/40) may be concurrent with, or precede occurrences of data access; which software applications (e.g., 20/40) or functions may trigger occurrences of data access, and the like.

As shown in FIG. 2, accelerator module 10 may include an access prediction module 130 (or prediction module 130 for short). Based on the monitoring of data access (e.g., based on ledger data element 110LD), access prediction module 130 may be configured to identify a memory area 30MB of source memory module 30, that contains a predetermined quantity of data that pertains to, or is expected to be used by one or more specific sink computing entities 40. The term "memory area" may be used in this context to describe a contiguous region of memory or storage in module 30, and should not imply any limitation to a specific structure or technology for storage.

Access prediction module 130 may subsequently mark memory area 30MB in memory module 30 as "speculative" data 130SP, in a sense that a sink-side computing entity 40 may, or is expected to request access to that memory area 30MB with high probability.

For example, prediction module 130 may identify a memory region that is characterized by spatial locality of data pertaining to one or more specific sink computing entities 40. As known in the art, the term "spatial locality" may refer to a tendency of a computer program to access data that is physically close to previously accessed data: when a particular memory location is accessed, nearby memory locations are likely to be accessed soon.

In that sense, such nearby memory locations may be regarded as expected to be used by the same computer program. Therefore, currently available cache memory modules may take advantage of spatial locality by storing blocks of data around recently accessed locations, increasing the chances of a cache hit (i.e., data being found in the cache) for subsequent memory accesses.

In some embodiments, prediction module 130 may calculate one or more metrics 130M of spatial locality of data stored at storage module 30, to single out memory areas 30MB of significant size (e.g., beyond a predetermined threshold), that hold data pertaining to, or expected to be used by at least one specific sink computing entity 40.

For example, metrics 130M may include a numeric distance between two memory addresses (e.g., pointers) accessed in storage 30, a size of memory buffers 30MB, an alignment of memory buffers 30MB (e.g., indicating alignment of start-addresses of memory buffers 30MB to a predetermined value (e.g. always start at 1 Megabyte increments), and the like.

Additionally, or alternatively, prediction module 130 may predict an extension 130EX of the identified memory area 30MB based on ledger data element 110LD. For example, ledger 110LD may include an indication of repetitiveness, such as a number of times (e.g., 100) or iterations of data-write access occurrences into storage module 30, made by a specifically identified source-side entity or function 20 of a specific source computing device 20. Prediction module 130 may then identify a memory region or area 30MB that is consisted of a certain (e.g., 50) number of data-write access occurrences, made by a similar entity or function 20, instantiated by another source computing device 20. Prediction module 130 may then expect, or predict the identified memory region or area 30MB to grow (e.g., to consist 100 quantity of written data), thereby defining extension area 130EX.

In another example, prediction module 130 may detection strides, where a source or sink computing entity (e.g., a program 20/40) may accesses (e.g., read or write) portions of data memory in fixed intervals (e.g. 5 Megabytes apart), thereby defining extension area 130EX.

Additionally, or alternatively, prediction module 130 may employ Machine Learning (ML) based algorithms to recognize patterns in access (e.g., read or write) of memory 30 and predict one or more future addresses or areas 30MB that are expected to be accessed based on the patterns of access.

For example, prediction module 130 may be, or may include an ML based model 130ML. During a training stage, ML model 130ML may receive a training dataset 130DS that may include a plurality of annotated data access requests, pertaining to specific computing entities (e.g., threads, processes, programs 20/40). The data access requests may be annotated in a sense that they may include indication of an eventual region 30MB that would be occupied by the respective computing entities 20/40. Accelerator 10 may subsequently utilize a training scheme (e.g., a backward propagation scheme), to train ML model 130ML, while using training dataset 130DS as supervisory information.

In a subsequent, inference stage, ML model 130ML may receive data access requests from sink 40 or source 20 computing entities and identify regions 30MB being accessed by a specific computing entity. Additionally, or alternatively, based on the training, ML model 130ML may classify, or predict one or more regions of memory 30 extension area 130EX corresponding to the same sink 40 or source 20 computing entities, thereby defining speculative data area 130SP.

Additionally, or alternatively, prediction module 130 may employ statistical analysis algorithms such as Bayesian inference to predict future access addresses in memory 30, thereby defining areas 30MB and/or 130EX as expected to be accessed by specific sink computing entities.

In such embodiments, prediction module 130 may use Bayes' theorem to keep track of probabilities for future events based on the occurrence of correlated past events. For example, prediction module 130 may relate to two locations in memory 30: location 'A' and location 'B'. When a sink computing entity (e.g., a process 40) alternates access between the two locations 'A' and 'B', applying Bayes' formula will suggest a high probability for accessing locations 'B' after 'A' (or vice versa). prediction module 130 may thereby define areas 30MB and/or 130EX as expected to be used by the relevant process 40.

In yet another example, prediction module 130 may employ statistical analysis algorithms such as Markov chains. In such embodiments, historical events of access to memory 30 may be translated to states or vertices in a Markov chain. Each pair of subsequent access events may update a probability of a specific graph edge in the Markov chain. Prediction module 130 may identify highest probability edge leaving the vertex that represents the last data memory access event. This edge may correspond to areas 30MB and/or 130EX that are most likely expected to be used by the relevant process 40.

Access prediction module 130 may subsequently mark, or define memory area 30MB as speculative data 130SP further based on the predicted extension memory area 130EX. Pertaining to the same example, speculative data area 130SP may represent a contiguous region of stored data in memory/ storage module 30, that includes (a) memory area 30MB and optionally (b) an adjacent memory space that may be the size of a predetermined portion or percentage of extension 130EX.

Additionally, or alternatively, when extension region 130EX is not defined, memory area 30MB and speculative data area 130SP may represent the same region in memory/ storage module 30, and may therefore be referred to herein interchangeably.

As shown in FIG. 2, system 100 may include one or more locker modules 50. Each locker module 50 may be regarded as a proxy memory, or storage module, and may be associated with one or more respective sink devices 40CD and/or sink-side computing entities 40. The term "proxy memory" may refer to a memory instance that is physically, or network-wise near (e.g., closer than memory module 30) to a respective sink device 40CD, thereby allowing quick retrieval of data by that sink device 40CD.

The term "locker" is used in this context to indicate a memory space or buffer that may be dedicated, or accessible (e.g., for reading) only by specific addressee or recipient sink device(s) 40CD or sink computing entity(es) 40.

For example, at least one (e.g., each) locker modules 50 may include one or more memory buffer modules 510, each associated with a unique, respective sink device 40CD and/or sink-side computing entity 40. In such embodiments, locker modules 50 may be viewed as an aggregation of "mailboxes", where each "mailbox" is a memory buffer module 510, adapted to serve a specific, unique sink device 40CD and/or sink-side entity 40.

According to some embodiments, accelerator 10 may include a messenger module 150, adapted to communicate with one or more locker modules 50 via communication network 60, as elaborated herein.

According to some embodiments, subject to a predetermined triggering event, accelerator 10 may transmit content of the identified memory area 30MB (denoted 150SP), to a specific locker module 50, via messenger module 150. Locker module 50 may store transmitted content 150SP in a specific locker storage space (e.g., buffer 510), that may be associated with, or allocated to a target sink device 40CD and/or a target sink-side computing entity 40.

Additionally, or alternatively, subject to a predetermined triggering event, accelerator 10 may transmit speculative data 130SP (e.g., content of memory area 30MB and a predetermined portion of predicted extension 130EX) as data 150SP, to the specific locker module 50, to be stored in a specific locker storage space (e.g., buffer 510). The specific locker storage space or buffer 510 may be associated with, or allocated to a specific, target sink device 40CD and/or a target sink-side computing entity 40.

It may be appreciated that the transmitted content 150SP of memory area 30MB (and/or speculative data 130SP) may be "speculative" in a sense that it may not yet be valid for use by a target sink device 40CD and/or target sink-side computing entity 40, at the time of transmission.

For example, content of memory area 30MB may be stale, or overrun at the time of transmission. In another example, content of the predicted extension 130EX to memory area 30MB may not yet have been written into memory module 30 at the time of transmission. In another example, transmitted content 150SP of memory area 30MB may not yet be required by target sink-side computing entity 40.

In other words, unlike currently available methods and systems for managing data access where data is sent from a source device to a sink device subject to explicit request of the latter, embodiments of the invention may exploit bandwidth of communication channels 60 in a non-intuitive approach.

By sending data that may, at least partially, be incorrect, stale, not up-to-date or even void, embodiments of the invention may exploit vacant communication channel 60 bandwidth to transfer a bulk of data that is expected, or speculated 130SP to be required by a sink-side computing entity 40, even before an explicit request for that data is actually received from sink-side computing entity 40.

As explained herein, following such an explicit request by sink-side entity 40, embodiments of the invention may only need amend, or "fill in the gaps" in data stored on buffer 510, thereby boosting throughput of data transfer between source (20/20CD) and sink (40/40CD) computing entities.

The term "explicit" may be used in the context of a data access request in a sense that sink-side entity 40 may communicate an actual message (e.g., a read request to source-side computing entity 20) to obtain data from memory module 30, according to its needs. This may be in contrast to a speculated request, where source-side entity 20 may expect, or speculate a need of sink-side entity 40 for content of a specific memory area 30MB (and optionally extension 130EX) and subsequently send (or "push" as commonly referred to in the art) the content of speculated data area 130SP (e.g., content of memory area 30MB and/or a predetermined portion of predicted extension 130EX), as data 150SP to a storage entity (e.g., locker 50) that is proximate to, and/or dedicated to the relevant sink device 40CD or sink-side entity 40.

Figure 3A:
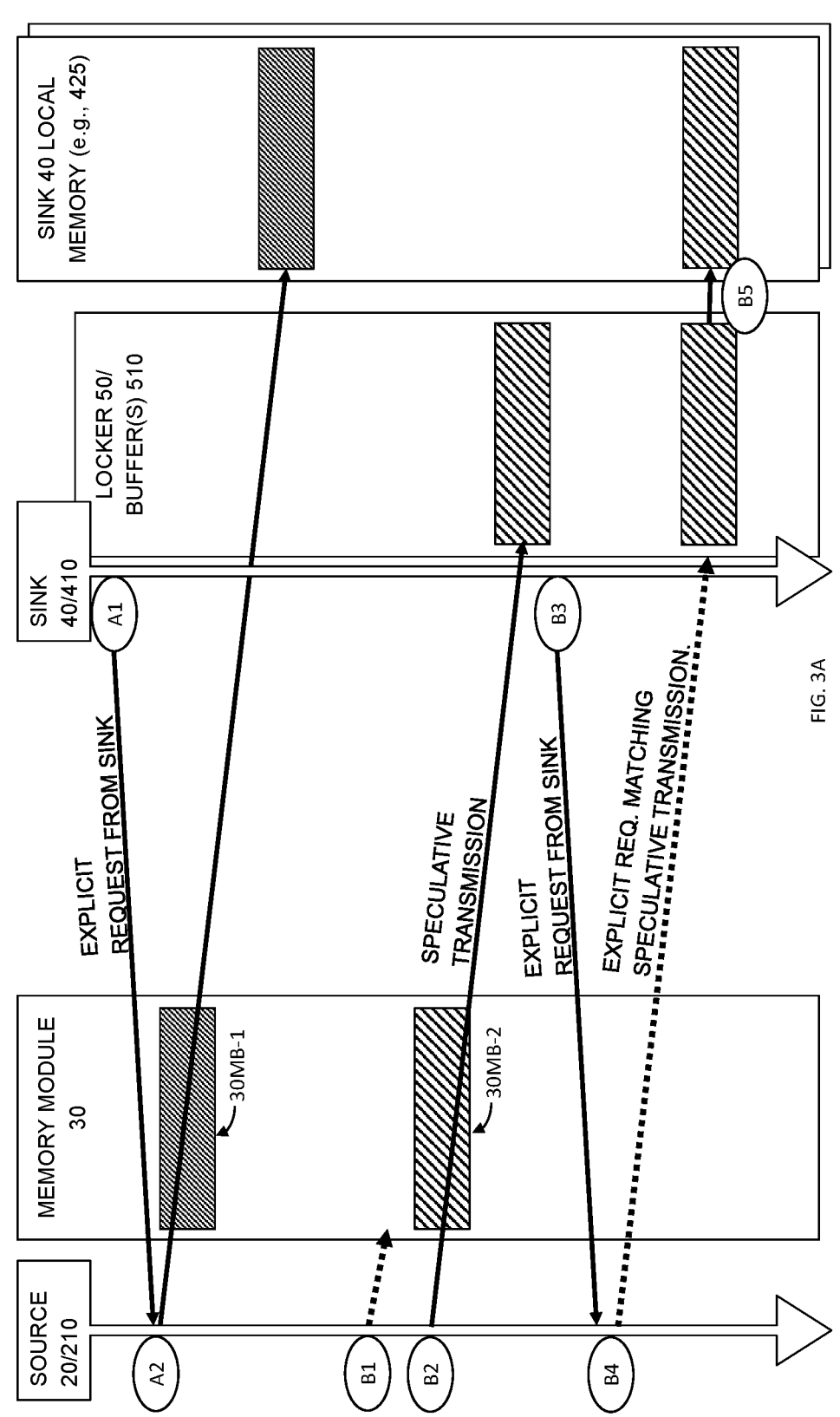
FIGS. 3A, 3B and 3C are sequence diagrams depicting examples of managing memory access among one or more computing entities, according to some embodiments of the invention.
Figure 3B:
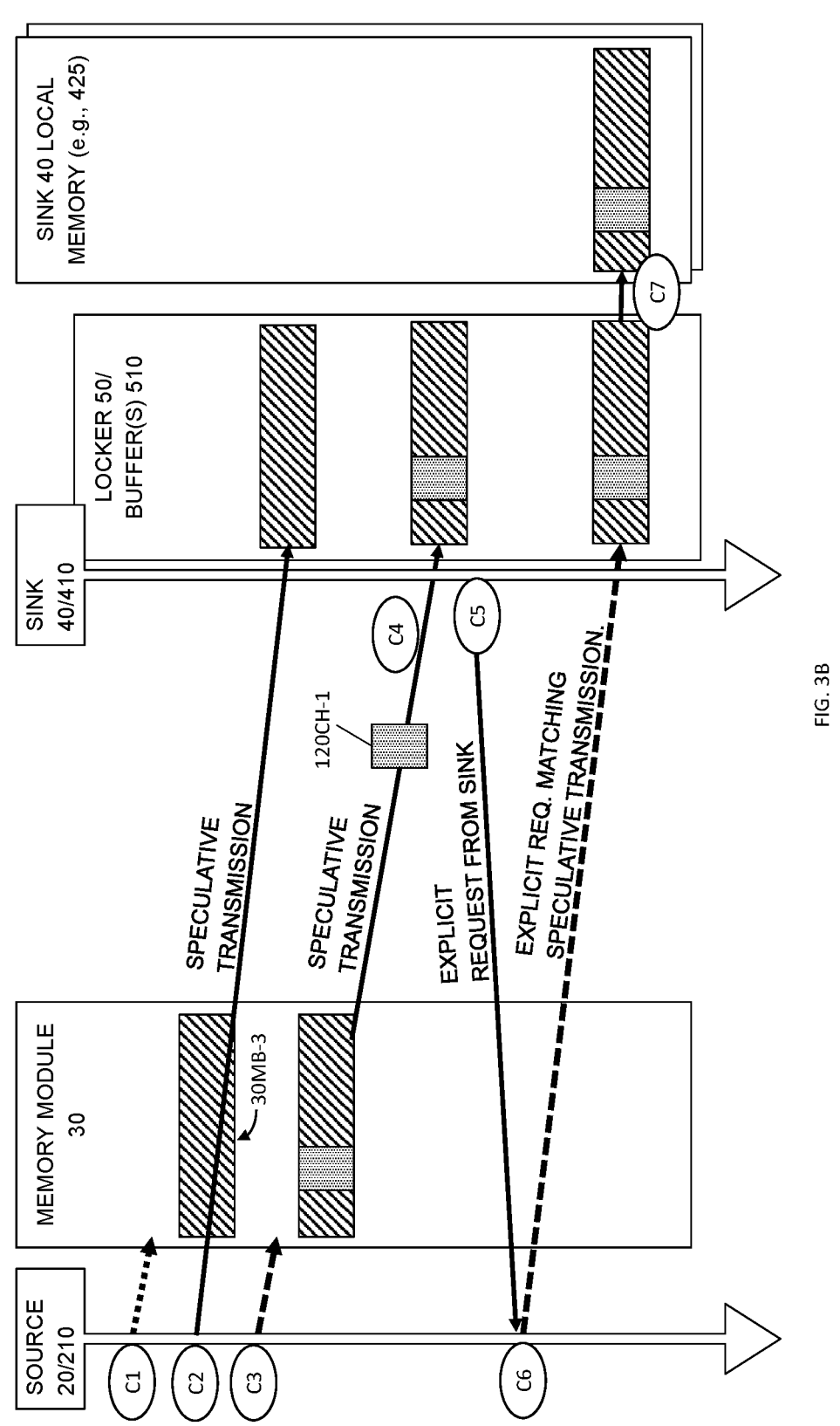
Figure 3C:
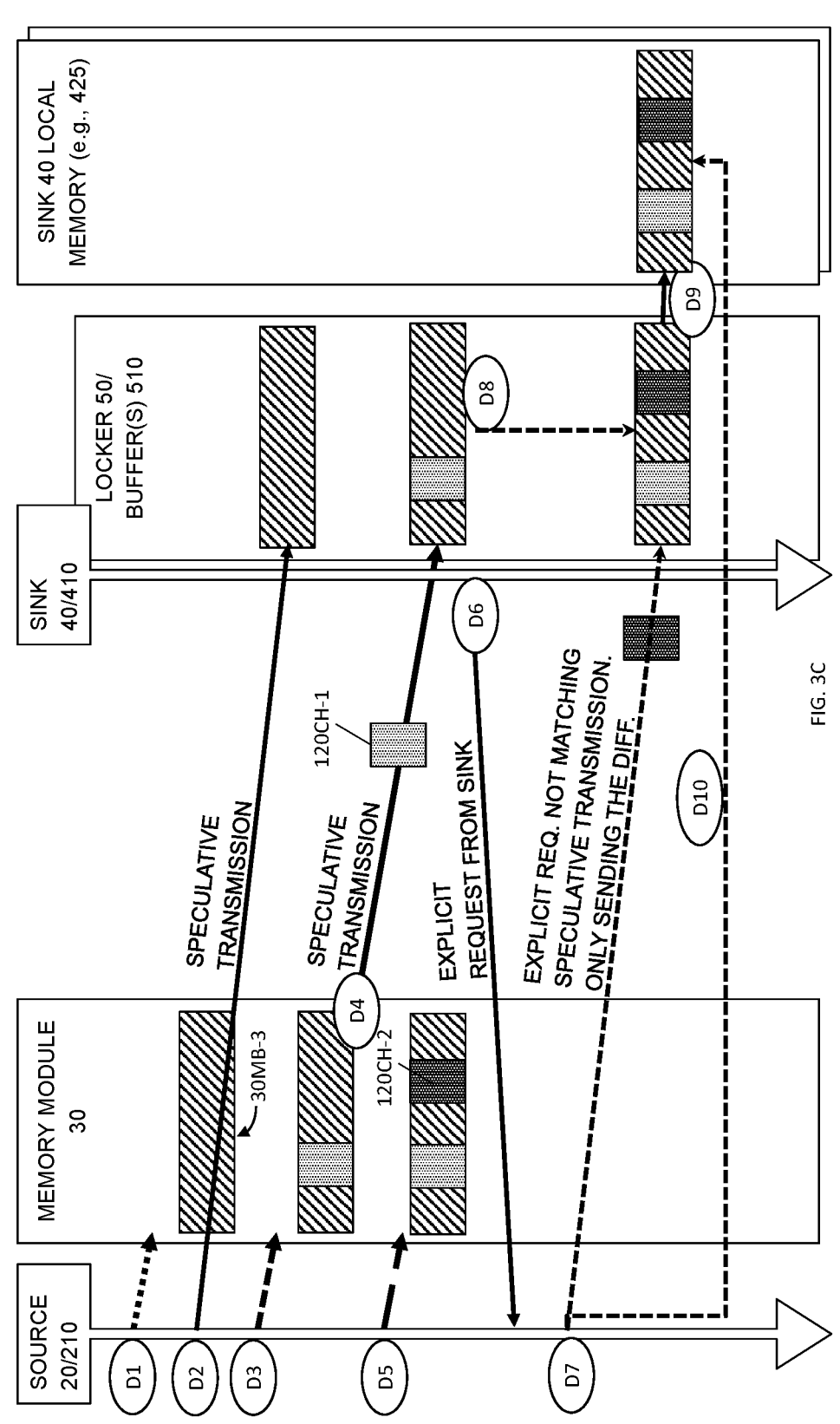

Reference is also made to FIGS. 3A, 3B, and 3C which are sequence diagrams depicting examples of managing memory access among one or more computing entities, according to some embodiments of the invention. Modules and entities enumerated in FIGS. 3A, 3B, and 3C may be the same as their counterparts in FIG. 2.

As shown in FIGS. 3A, 3B, and 3C, one or more source-side computing entities 20 may be executed or processed by at least one source device 20CD, to handle access to at least one memory module 30. Additionally, one or more sink-side computing entities 40 may be executed or processed by at least one sink device 40CD.

In some embodiments, the at least one source device 20CD may be implemented by a first computing device (e.g., computing device 1 of FIG. 1), and the at least one sink device 40CD may be implemented by another, communicatively connected computing device 1 (e.g., via cellular data connection, Internet connection and the like).

Additionally, or alternatively, the at least one source device 20CD and at least one sink device 40CD may be implemented on the same computing device 1, allowing entities 20 and 40 to communicate via any appropriate protocol (e.g., IPC protocol) or mechanism, as known in the art.

As shown by arrow A1, sink computing entity 40 may send an explicit data access request (e.g., a read request) to source entity computing 20, to read a first data memory area 30MB (denoted 30MB-1) on memory module 30. Source computing entity 20 may subsequently accommodate the explicit data access request A1, and send (arrow A2) the required data 30MB (30MB-1) and/or 130SP to sink entity 40, either directly (e.g., to a local memory of sink 40) or via a buffer 510 associated with sink computing entity 40 or sink device 40CD.

As explained herein, accelerator 10 (memory access monitor module 110) may monitor data access requests (e.g., write, modify, delete, etc.), to memory areas 30MB of memory module 30. Such data access requests may, for example, originate from source computing entities 20 (arrow B1), sink computing entities 40, and/or from third-party computing entities or devices.

As elaborated herein, accelerator 10 (access predictor module 130) may analyze data access ledger 110LD, to learn a pattern of data access requests from sink computing entity 40 (e.g., read request of 30MB-1). Based on this analysis (e.g., the learnt pattern), access predictor module 130 may identify a memory area 30MB (denoted 30MB-2), and optionally adjacent extension area 130EX, as a speculative data 130SP that is expected to be used in the future by at least one sink computing entity 40 or sink device 40CD.

Source entity 20 subsequently pushes, or performs unsolicited transmission of a first version (e.g., a speculated version) of content of the identified memory area 30MB-2 to the one or more sink computing entities 40 or sink device 40CD, either directly or via locker module 50. For example, as shown by arrow B2, source entity 20 may push the identified speculative data 130SP (e.g., 30MB-2 and optionally extension area 130EX) to locker module 50 as data

150SP. Locker module 50 may then store data 150SP in a locker memory space (e.g., buffer 510) that is associated with the at least one requesting sink computing entity 40 or device 40CD.

As shown by arrow B3, monitoring module 110 may monitor access to memory module 30, and identify an explicit data access request, from a specific sink computing entity 40 to the at least one source computing entity 20, for accessing (e.g., reading) data of the identified memory area. For example, sink computing entity 40 may send an explicit request to source computing entity 20, to read identified data from a location defined by memory area 30MB-2 and/or speculative data 130SP (memory area 30MB-2 and extension area 130EX).

Subject to identifying the explicit data access request of (arrow B3), accelerator 10 may determine that the content of memory area 30MB-2 has not changed since transmission of 150SP (arrow B2), and that therefore the explicitly requested data matches the data stored in locker 50. Accelerator 10 may subsequently control (arrow B4) locker module 50 to dispense, or forward (arrow B5) the transmitted memory area content (e.g., 150SP, now content of buffer 510) to the requesting sink computing entity 40 (or to a sink device 40CD associated with the specific sink computing entity 40).

For example, accelerator 10 may send a release message 150RL or signal to locker module 50, thereby allowing locker 50 to dispense, or forward the transmitted memory area content 150SP (e.g., now content of buffer 510) to a local memory (e.g., buffer 425) of the relevant, requesting sink computing entity 40 of sink device 40CD.

Additionally, or alternatively, accelerator 10 may communicate with sink computing entity 40 or sink device 40CD of the explicit request, to redirect that sink (40/40CD), so as to read the required data from the dedicated buffer 510 of locker 50.

In other words, accelerator 10 may transmit the content of the identified memory area 30MB-2 to one or more sink computing entities, via locker 50: Accelerator 10 may transmit content of identified memory area 30MB-2 to locker module 50, having a locker storage space (e.g., buffer(s) 510). Based on the monitoring of data access to memory 30, accelerator 10 may identify an explicit request (arrow B3), from a specific sink computing entity to the at least one source computing entity, for accessing data of the identified memory area 30MB-2. Subject to identifying the explicit request, accelerator 10 may control (arrow B4) locker module 50 to dispense, or allow access to the transmitted memory area 30MB-2 content to the specific, requesting sink computing entity 40 (or to a sink device 40CD associated with, or hosting the specific sink computing entity 40).

As shown in FIG. 3B, arrows C1 and C2 depict writing of data into a memory area 30MB (denoted 30MB-3), and forwarding that data as a speculative memory area 130SP to locker 50. This is similar to the process described above in relation to arrows B1 and B2 of FIG. 3A, and will not be repeated here for brevity.

As shown in FIG. 2, accelerator 10 may include a change tracking module 120 (or "change tracker 120", for short). Change tracker 120 may be configured to collaborate with memory access monitoring module 110, to identify a change 120CH in content of an identified speculative memory area (30MB and/or 130SP) in memory module 30, based on the monitoring of access memory module 30 (e.g., based on ledger 110LD).

According to some embodiments, change 120CH may include data structure that may represent a difference between a first (e.g., "original") version of content of identified speculative memory area (30MB and/or 130SP), and a second (e.g., "modified") version of content of that memory area.

For example, change 120CH may include a table that holds actual portions of difference, or changed data between the original and modified versions of content, and their associated addresses in memory module 30.

In another example, change 120CH may include a hashing, or encoding of the difference between original and modified versions of content, that may allow locker 50 to modify stored content in buffer(s) 510 to match the latest version of data in memory module 30.

As shown in FIG. 3B, a change may be made (arrow C3) to speculative memory area (30MB and/or 130SP) in memory module 30. Change tracker 120 may identify occurrence of the applied change in the content of identified memory area 30MB based on the monitoring of data access, to memory 30 (e.g., as registered in ledger 110LD). Change tracker 120 may calculate the difference or change 120CH (denoted 120CH-1) between a first version of content of the identified memory area (e.g., speculative transmission arrow C2) and a current content of the identified memory area (e.g., arrow C3), as elaborated herein.

Accelerator 10 subsequently performs unsolicited transmission, or pushes the identified change, or difference 120CH to locker module 50, as shown by arrow C4. The term "push" may infer unsolicited or unrequested transfer of data, as commonly used in the art of computer communication.

Additionally, or alternatively, subject to detection of a change in MB30 (arrow C3), messenger module 150 may transmit the entire content of the changed memory area 30MB/130SP (e.g., not just change 120CH-1), as data 150SP, to locker 50 (arrow C4).

Locker module may be configured to store an amended version of the transmitted content in the locker storage space (e.g., buffer(s) 510), based on the calculated difference or change 120CH.

For example, locker 50 may obtain the amended version of the transmitted content, e.g., by applying the pushed change 120CH on previously received content 150SP, and/or by receiving an entire amended version of speculative memory area (30MB and/or 130SP). Locker 50 may store the amended version of the transmitted content 150SP in the locker storage space (e.g., buffer 510) that corresponds to at least one sink entities.

Monitoring module 110 may subsequently identify an explicit request (arrow C5) from sink computing entity 40 to source computing entity 20, to read identified data from a location defined by memory area 30MB-3 and/or speculative data area 130SP (e.g., memory area 30MB-3 and extension area 130EX).

Subject to identifying the explicit data access request of arrow C5, accelerator 10 may determine that the content of memory area 30MB-3 has not changed since transmission of 150SP (arrow C4), and that therefore the explicitly requested data matches the data stored in locker 50. Accelerator 10 may subsequently control (arrow C6) locker module 50 to dispense (arrow C7) or forward the amended version of transmitted 150SP memory area content (e.g., now content of buffer 510) to the specific, requesting sink computing entity 40.

For example, messenger module 150 may send a release message 150RL or signal to locker module 50, thereby allowing locker 50 to dispense, or forward the amended version of transmitted memory area content 150SP (e.g., now content of buffer 510) to a local memory (e.g., buffer 425) of the relevant, requesting sink computing entity 40 of sink device 40CD.

FIG. 3C shows yet another example of a scenario of managing data access by embodiments of the invention. Arrows D1-D4 depict writing of data into a memory area 30MB (denoted 30MB-3), and forwarding that data as a speculative memory area 150SP to locker 50. This is similar to the process described above in relation to corresponding arrows C1-C4, and will not be repeated here for brevity.

As shown in FIG. 3C, monitoring module 110 may identify a second change 120CH (denoted 120CH-2, arrow D5) in memory area 30MB-3, followed by an explicit data access request (arrow D6) from sink computing entity 40 to source computing entity 20.

Subject to identifying the explicit data access request of arrow D6, accelerator 10 may determine that the content of memory area 30MB-3 has changed since transmission of 150SP (arrow D4), and that therefore the explicitly requested data in memory area 30MB-3 does not match the data stored in locker 50.

According to some embodiments, and as shown by arrow D7, accelerator 10 may subsequently (a) transmit change 120CH-2 to locker 50, and (b) transmit a release message or signal 150RL to locker 50. Locker 50 may integrate (arrow D8) 120CH-2 into the previously amended content 150SP of memory area 30MB-3/130SP (arrow D4) to produce a second amended version of the data of 30MB-3/130SP. Locker 50 may then dispense or forward the second amended version of transmitted memory area content 150SP (e.g., now content of buffer 510) to a local memory (e.g., buffer 425) of the relevant, requesting sink computing entity 40 or sink device 40CD.

Additionally, or alternatively, accelerator 10 may interface the relevant sink computing entities 40 directly, e.g., not via locker 50 or buffers 510. In such embodiments, accelerator 10 may identify, based on the continuous monitoring of data access, an explicit request (e.g., arrow D6) from a specific sink computing entity 40 to at least one source computing entity 20, for accessing data of the identified memory area 30MB. Subject to identifying this explicit request, change tracker module 120 may calculate a change or difference 120CH between a first version (e.g., arrow D3) of content of the identified memory area 30MB-3 and a current content (e.g., arrow D5) of the identified memory area 30MB-3. Accelerator 10 may subsequently transmit the calculated difference 120CH in content of the identified memory area 30MB-3 to the one or more sink computing entities 40 (e.g., not via locker 50).

According to some embodiments, messenger module 150 may collaborate with monitoring module 110 to transmit the content of the identified memory area 30MB/130SP based on occurrence of a triggering event 150TE.

For example, monitoring module 110 may monitor data access to one or more source devices 40CD, to identify occurrence of a triggering event 150TE pertaining to data traffic on network 60. For example, triggering event 150T may include an indication that data traffic in network 60 is below a predetermined threshold 150TH. Such indication may be regarded as estimation of a benefit in sending speculative data of 30MB/130SP over network 60, at that time. Messenger module 150 may, in turn, transmit content of the identified memory area 30MB/130SP as data 150SP to locker module 50, subject to the identified occurrence. In this example, the timing of transmission to a period of low traffic may optimize network bandwidth 60, and improve data throughput.

In another example, monitoring module 110 may monitor data access to one or more source devices 40CD, to calculate a rate, or frequency at which data pertaining to the one or more sink computing entities is written into memory area 30MB/130SP. Based on the calculated rate, messenger module 150 may predict a future timestamp at which the defined memory area 30MB/130SP will include a predetermined portion 150P of relevant data. In such embodiments, occurrence of triggering event 150TE may be an elapse of the predicted timestamp.

For example, as elaborated herein, monitoring module 110 may identify memory area 30MB as being gradually written, by source-side computing entity 20, over a plurality of (e.g., 60) iterations. Predictor module 130 may subsequently expect additional (e.g., 40) write iterations into memory model 50, thereby defining an adjacent extension region 130EX to memory area 30MB. In this example, speculative memory area 130SP may represent the combination of identified memory area 30MB and extension region 130EX, and may correspond to 100 write iterations. Based on the frequency of memory 30 write requests, messenger module 150 may predict a future timestamp at which speculative memory area 130SP will include a predetermined percentage 150P (e.g., 80%) of fresh, or up-to-date (e.g., not overridden) data. In this example, the future timestamp may relate to an expected time at marking 80 write access iterations into memory module 30. Messenger module 150 may then identify occurrence of triggering event 150TE as the elapse of the predicted timestamp, to transmit speculative memory area 130SP as data 150SP to locker 50.

It may be appreciated that by correct selection of percentage 150P, accelerator 10 may further optimize throughput of data from source computing entity 20 (e.g., source-side device 20CD) to sink computing entity 40 (e.g., sink-side device 40CD): Selecting a percentage 150P that is too small may reduce an efficiency of sending speculative data over network 60, whereas selecting a percentage 150P that is too large may raise the overhead of calculating changes 120CH and amending data in buffers 510.

According to some embodiments, memory access monitoring module 110 may monitor and store (e.g., as part of ledger 110LD) one or more parameters 110P of data transfer over communication channel 60, and utilize parameters 110P, in collaboration with messenger module 150, to calculate percentage 150P.

For example, parameter 110P may include a metric of available data transfer bandwidth over communication 60, on both sides (e.g., source(s) 20 and sink(s) 40). It may be appreciated that a large bandwidth parameter value 110P may facilitate higher tolerance to "wasted" transmissions, e.g., making transmission of speculated data 130SP over communication channel 60 more beneficial.

In another example, parameter 110P may include a metric of available space on the receiver's side (e.g., on locker 50 buffer(s) 510 and/or buffer(s) 425). It may be appreciated that sufficient space on the receiver's side may be prerequisite to transmit speculative data 130SP over communication channel 60.

Another factor or parameter 110P may include, for example a metric of impact of speculative transmissions on the performance (e.g., throughput and latency) of source and/or sink computing entities (20/40) and/or devices (20CD/40CD).

Another example for parameter 110P may include a metric representing tendency of a source computing entity 20 to revisit, or change the same memory area 30MB, e.g., where a high tendency may indicate a low benefit in transmitting of speculative data 130SP over communication channel 60.

According to some embodiments, messenger module 150 may utilize the information in ledger 110LD (e.g., parameters 110P) to automatically (e.g., without additional configuration), continuously (e.g., repeatedly over time), and dynamically (e.g., conforming to changes in monitored data) calculate, or adjust percentage 150P. Messenger module 150 may thereby facilitate optimal, run-time utilization of both (a) the bandwidth of communication channel 60, and (b) allocated memory space on the receiver's side.

Additionally, or alternatively, messenger module 150 may calculate, or relate to other triggering events 150TE, to determine a time for sending data 150SP.

For example, triggering event 150TE may include the filling of the identified memory area 30MB with a predetermined portion or percentage 150P of fresh data pertaining to the one or more sink computing entities 40.

In another example, triggering event 150TE may include identification of a predefined number of write, delete or modify data accesses to the defined memory area 30MB.

In another example, triggering event 150TE may include elapse of a predetermined, recurring time frame (e.g., time elapsed from a previous data access).

In yet another example, triggering event 150TE may include occurrence of a specific program-counter value in a computing device associated with the one or more sink computing entities 40, and/or occurrence of a specific program-counter value in a source device 20CD of one or more source computing entities 20.

Additionally, or alternatively, monitoring module 110 may be configured to further monitor one or more signals 110S of the one or more source computing entities 20 and/or one or more sink computing entities 40. Signals 110S may, for example reflect occurrence of software and/or hardware events in respective source 20CD and sink 40CD devices, and may include, for example a software or hardware interrupt; occurrence of communication among the source 20CD and/or sink 40CD devices; a value of a register (e.g., a program counter register) in the source 20CD and/or sink 40CD devices; and the like.

Based on the monitoring of signals 110S, monitoring module 110 may recognize at least one signal 110S as likely to precede an explicit request for accessing data of the memory area 30MB.

For example, a specific interrupt signal 110S in sink computing entity 40 may trigger a function call, that may eventually produce an explicit data access request to memory area 30MB. In such cases, it may be beneficial for accelerator to transmit speculated data area 130SP to locker 50 directly following interrupt 110S, and before an explicit read request is received from sink computing entity 40.

In such embodiments, monitoring module 110 may identify the occurrence of triggering event 150TE as occurrence of the recognized signal 110S, to transmit data 150SP to locker 50.

Additionally, or alternatively, messenger module 150 may utilize statistical methods to anticipate a timing of trigger event 150TE, (e.g., the next transmission 150SP time). For example, messenger module 150 may include an ML based model 150ML.

ML model 150ML may (e.g., during a training stage) receive a training dataset. The training dataset may include tuples of data transfer parameters 110P, adjoint with corresponding labels or annotations 150AN. Annotations 150AN may indicate an optimal time or gap in the future for transmitting data 150SP, in view of the associated data transfer parameters 110P. ML model 150ML may be pre-trained based on data transfer parameters 110P of the training dataset, to predict an appropriate triggering event 150TE (in this case, a time in the future) for transmitting data 150SP, using annotations 150AN as supervisory data, as known in the art.

ML model 150ML may subsequently (e.g., during an inference stage) predict triggering event 150TE (time in the future) for transmitting data 150SP according to the training, and based on incoming information (e.g., as reflected in parameters 110P and ledger 110LD).

As shown in FIG. 2, accelerator module 10 may include a deprecation module 140, adapted to collaborate with monitoring module 110 to manage deallocation of memory in locker 50 (e.g., buffers 510) and/or memory module 30.

According to some embodiments, monitoring module 110 may be configured to identify deallocation, or freeing of memory area 30MB of source memory module 30. Deprecation module 140 may subsequently communicate a release message, distinguishing (e.g., by an address, by an identification number, etc.) the deallocated memory area 30MB (e.g., previously sent as data 150SP) to locker module 50. Locker module 50 may, in turn, deallocate, or release a region of the locker storage space (e.g., in buffer 510, corresponding to data 150SP) based on the release message.

Additionally, or alternatively, accelerator 10 may maintain storage in locker 50 based on the lockers' capacity and/or priority of data.

For example, data stored on memory module 30 may be attributed with a priority indication 30P, distinguishing memory areas 30MB of higher priority from memory areas 30MB of lower priority. According to some embodiments, deprecation module 140 may communicate with at least one locker module 50, to identify an overflow of at least one locker storage space (e.g., buffer 510) in locker 50. In this context, the term "overflow" may indicate storage of a quantity of data in buffer 510, that is above a predetermined threshold value.

Deprecation module 140 may subsequently communicate a release message, distinguishing a low-priority 30P memory area 30MB to the relevant locker module 50.

Locker module may, in turn, release a region of the locker storage space (e.g., in buffer 510, corresponding low-priority 30P memory area 30MB) based on the release message.

Reference is now made to FIG. 4, which is a flow diagram depicting a method of managing memory access among one or more computing entities, by at least one processor (e.g., processor 2 of FIG. 1), according to some embodiments of the invention.

As shown in step S1005, the at least one processor 2 may continuously (e.g., repeatedly, over time) monitor data access to at least one source memory module (e.g., memory 30 of FIG. 2), associated with at least one respective source computing entity (e.g., source computing entity 20 of FIG. 2).

As shown in step S1010, based on the monitoring of data access, the at least one processor 2 may identify a memory area 30MB of the source memory module 30 that contains a predetermined quantity of data that pertains to one or more sink computing entities 40. For example, the at least one processor 2 may identify memory area 30MB as storing data that is expected to be used by sink computing entities 40 such as applications, processes or threads.

As shown in step S1015, the at least one processor 2 may transmit content of the identified memory area 30MB (e.g., the data that is expected to be used by the applications, processes or threads 40 of the specific sink computing entity 40) to a memory module that is associated with the specific sink computing entity 40. For example, the at least one processor 2 may transmit content of the identified memory area 30MB to a locker module (e.g., locker 50 of FIG. 2), that includes one or more memory buffers 510. Each buffer may be dedicated to, or associated with a specific sink computing entity 40, and may be accessible to that sink computing entity 40 for retrieval of data originally stored in memory area 30MB.

As shown in steps S1020 and S1025, based on the continuous monitoring of data access, the at least one processor 2 may identify an explicit request, from the specific sink computing entity to the at least one source computing entity, for accessing the data of the identified memory area 30MB. Subject to identification of the explicit request, the at least one processor 2 may control the memory module (e.g., locker module 50) to dispense the transmitted content to the specific sink computing entity 40.

For example, processor 2 may identify a data read request, originating from a specific computing device 40CD that is associated with, or hosting sink computing entity 40 (e.g., computing application, process or threads 40), to access memory area 30MB. Following such identification, processor 2 may communicate with, or control locker 50 (e.g., buffer 510) to allow computing device 40CD or sink computing entity 40 to access data of memory area 30MB (now stored in locker 50). Additionally, or alternatively, processor 2 may communicate with computing device 50CD and/or sink computing entity 40 to redirect the data read request so as to access locker 50 (e.g., buffer 510), rather than memory module 30 for the required data.

Reference is now made to FIG. 5, which is a flow diagram depicting a method of managing memory access among one or more computing entities, by at least one processor (e.g., processor 2 of FIG. 1), according to some embodiments of the invention.

As shown in step S2005, the at least one processor 2 may continuously (e.g., repeatedly, over time) monitor data access to at least one source memory module (e.g., memory 30 of FIG. 2), associated with at least one respective source computing entity (e.g., source computing entity 20 of FIG. 2).

As shown in steps S2010 and S2015, based on the monitoring of data access, the at least one processor 2 may identify a memory area 30MB of the at least one source memory module that contains a predetermined quantity of data, that is expected to be used by one or more sink computing entities 40. The at least one processor 2 subsequently performs unsolicited transmission, or pushes (e.g., arrow B2 of FIG. 3A) a first version of content of the identified memory area 30MB to the one or more sink computing entities 40.

As shown in steps S2020, based on the monitoring of data access, the at least one processor 2 may identify an explicit request (e.g., arrow B3 of FIG. 3A), from a specific sink computing entity 40 to the at least one source computing entity 20, for accessing data of the identified memory area 30MB.

As shown in steps S2025, subject to identifying the explicit request, the at least one processor 2 may calculate a change or difference (as used here interchangeably) 120CH between the first version of content of the identified memory area 30MB and a current content of the identified memory area 30MB.

As shown in steps S2030, the at least one processor 2 may subsequently transmit the calculated difference 120CH in content of the identified memory area 30MB to the one or more relevant (e.g., requesting) sink computing entities 40.

Embodiments of the invention may include a practical application, to improve the functionality of computing, and storage devices. As elaborated herein, by transmitting speculated data between computing entities, embodiments of the invention may allow efficient exploitation of communication bandwidth, in a variety of applications (e.g., among computers, among processes within a single computer, etc.), in a non-intuitive manner.

Embodiments of the invention may be reminiscent of caching systems, where "hot" (e.g., frequently used) data may be stored in proximity to a processor that consumes that data. However, embodiments of the invention may differ from the concept of caching, allowing improved exploitation of vacant bandwidth of communication channel 60, and optimizing throughput of data transfer between entities:

For example, data 130SP transmitted to buffers 510 may be "speculative", in a sense that it may be partially incorrect at the time transmission, e.g., at the time of storing the data in the proximate memory location. Embodiments of the invention may then use the bulk of transmitted speculative data 130SP information, and only apply necessary amendments to data in buffers 510, to improve overall throughput of data among the source 20 and sink 40 computing entities. This is in contrast to caching systems where the data is stored in a proximate memory location subsequent to an explicit reading of up-to-date information by a data consumer, e.g., a sink-side entity. Currently available caching methods may therefore not allow such optimization of communication channels' bandwidth.

In another example, embodiments of the invention may differ from the concept of caching by predicting, and "pushing" speculative data 130SP by a source-side application (e.g., a data provider), facilitating throughput of data transfer between source 20 and sink 40 computing entities. This is in contrast to caching systems where the data is stored in a proximate memory location subsequent to an explicit reading of data by the data consumer.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. An accelerator comprising a non-transitory program memory device, wherein modules of instruction code are stored, and at least one processor associated with the non-transitory program memory device, and configured to execute the modules of instruction code, whereupon execution of said modules of instruction code, the at least one processor is configured to:

continuously monitor data access to at least one source memory module, associated with at least one respective source computing entity;

based on said monitoring, identify a memory area of the at least one source memory module that contains a predetermined quantity of data that is expected to be used by one or more sink computing entities;

push a first version of content of the identified memory area to the one or more sink computing entities, via a communication network;

based on said monitoring, identify an explicit request, from a specific sink computing entity of the one or more sink computing entities to the at least one source computing entity, for accessing data of the identified memory area;

subject to identifying said explicit request, calculate a difference between the pushed, first version of content of the identified memory area and a current content of the identified memory area; and transmit the calculated difference in content of the identified memory area to the specific sink computing entity, via the communication network, thereby boosting throughput of data transfer between the at least one source computing entity and the specific sink computing entity.

2. The accelerator of claim 1, wherein the at least one processor is configured to transmit the content of the identified memory area to the one or more sink computing entities by:

pushing the content of the identified memory area via a communication network to a sink-side proxy memory locker, having a locker storage space;

based on the monitoring of data access, identifying the explicit request, from the specific sink computing entity to the at least one source computing entity; and subject to identifying said explicit request, controlling the sink-side proxy memory locker, to dispense the transmitted memory area content to a computing device associated with the specific sink computing entity.

3. The accelerator of claim 2, wherein the at least one processor is further configured to:

based on the monitoring of data access, identify a change in content of the identified memory area;

calculate a difference between the first version of content of the identified memory area and a current content of the identified memory area; and transmit the calculated difference in content of the identified memory area to the sink-side proxy memory locker, wherein the sink-side proxy memory locker is configured to store an amended version of the transmitted content in the locker storage space, based on the calculated difference.

4. The accelerator of claim 3, wherein the at least one processor is further configured to:

based on the monitoring of data access, identify an explicit request, from a specific sink computing entity to the at least one source computing entity, for accessing data of the identified memory area; and subject to identifying said explicit request, control the sink-side proxy memory locker to dispense the amended version of the transmitted content to the specific sink computing entity or to a computing device associated with the specific sink computing entity.

5. The accelerator of claim 3, wherein the at least one processor is further configured to control the sink-side proxy memory locker, so as to dispense the amended version of the transmitted memory area content to the specific sink computing entity.

6. The accelerator of claim 2, wherein the at least one processor is configured to identify the memory area of the source memory module by:

based on said monitoring, identifying a memory region characterized by spatial locality of data pertaining to the one or more sink computing entities;

predicting an extension of the identified memory region; and defining the memory area based on said predicted extension.

7. The accelerator of claim 6, wherein the at least one processor is further configured to:

based on said monitoring of data access, identify occurrence of a triggering event; and transmit said content of the identified memory area to the sink-side proxy memory locker, subject to the identified occurrence.

8. The accelerator of claim 7, wherein the at least one processor is further configured to:

calculate a rate at which data pertaining to the one or more sink computing entities is written into the defined memory area;

based on the calculated rate, predicting a future timestamp at which the defined memory area will comprise a predetermined portion of fresh data; and identify the occurrence of a triggering event as elapse of the predicted timestamp.

9. The accelerator of claim 7 wherein the triggering event is selected from a list consisting of: (i) filling of the defined memory area with a predetermined portion of fresh data pertaining to the one or more sink computing entities, (ii) identifying a predefined number of write, delete or modify data accesses to the defined memory area, (iii) elapse of a predetermined, recurring time frame, (iv) occurrence of a specific program-counter value in a computing device associated with the one or more sink computing entities, and (v) occurrence of a specific program-counter value in a computing device associated with the one or more source computing entities.

10. The accelerator of claim 7, wherein the at least one processor is further configured to:

monitor signals of the one or more source computing entities or one or more sink computing entities;

based on said monitoring of signals, recognizing at least one signal as likely to precede the explicit request for accessing data of the identified memory area; and identify the occurrence of a triggering event as occurrence of the recognized at least one signal.

11. The accelerator of claim 2, wherein the at least one processor is further configured to:

identify deallocation of the memory area of the source memory module; and communicate a release message, distinguishing the deallocated the memory area, to the sink-side proxy memory locker, wherein the sink-side proxy memory locker is configured to release a region of the locker storage space based on the release message.

12. The accelerator of claim 2, wherein the at least one processor is further configured to:

identify an overflow of the locker storage space; and communicate a release message, distinguishing a low-priority memory area, to the sink-side proxy memory locker, wherein the sink-side proxy memory locker is configured to release a region of the locker storage space based on the release message.

13. The accelerator of claim 1, wherein the one or more sink computing entities and the at least one source computing entities pertain to a common software application, executed by a common computing device.

14. The accelerator of claim 1, wherein the one or more sink computing entities are executed by one or more respective client computing devices, and wherein the at least one source computing entities are executed by at least one respective server computing devices.

15. A system for managing memory access, the system comprising:

(a) one or more source computing devices associated with at least one source memory module;

(b) an accelerator, adapted to:

continuously monitor data access to the at least one source memory module;

based on said monitoring, identify a memory area of the at least one source memory module that contains a predetermined quantity of data that is expected to be used by one or more sink computing entities;

push content of the identified memory area to a sink-side proxy memory locker via a communication network;

based on said monitoring, identify an explicit request, from a specific sink computing entity of said one or more sink computing entities, to the at least one source computing entity, for accessing data of the identified memory area;

subject to the identification of the explicit request, transmitting a difference between the pushed, first version of content of the identified memory area and a current content of the identified memory area, to the sink-side proxy memory locker, thereby boosting throughput of data transfer between the at least one source computing entity and the specific sink computing entity, and communicating a release message to the sink-side proxy memory locker, and (c) the sink-side proxy memory locker, configured to dispense said content of the identified memory area to the specific sink computing entity based on the release message.

16. A method of managing memory access among one or more computing entities, by at least one processor, the method comprising:

continuously monitoring data access to at least one source memory module, associated with at least one respective source computing entity;

based on said monitoring, identifying a memory area of the source memory module that contains a predetermined quantity of data that pertains to one or more sink computing entities;

pushing a first version of content of the identified memory area, via a communication network, to a sink-side proxy memory locker, having a locker storage space;

based on said monitoring, identifying an explicit request, from a specific sink computing entity of the one or more sink computing entities to the at least one source computing entity, for accessing data of the identified memory area;

subject to identification of the explicit request, transmitting a difference between the pushed, first version of content of the identified memory area and a current content of the identified memory area to the sink-side proxy memory locker, thereby boosting throughput of data transfer between the at least one source computing entity and the specific sink computing entity; and controlling the sink-side proxy memory locker to dispense the transmitted content to the specific sink computing entity.

17. The method of claim 16, wherein the sink-side proxy memory locker is configured to store an amended version of the transmitted content in the locker storage space, based on said difference.

\* \* \* \* \*